United States Patent [19]
Lania et al.

[11] 3,855,051
[45] Dec. 17, 1974

[54] THERMAL BARRIER TAPE

[75] Inventors: Anthony R. Lania, Lexington; Edward L. Chase, Brockton; Francis M. Chase, Cohasset; Leonard P. Graham, Canton; James E. Murray, Norwood, all of Mass.

[73] Assignee: Chase Corporation, Randolph, Mass.

[22] Filed: Mar. 16, 1973

[21] Appl. No.: 341,934

Related U.S. Application Data

[63] Continuation-in-part of Ser. No. 77,248, Oct. 1, 1970, abandoned.

[52] U.S. Cl............ 161/165, 161/194, 161/203, 174/120 R, 174/120 SR, 174/121 R, 174/121 SR, 174/122 G
[51] Int. Cl............................................. B32b 17/10
[58] Field of Search ........... 161/165, 170, 194, 203, 161/204; 162/138, 156; 156/52–56; 174/121 R, 121 SR, 120 SR, 120 R, 122 G, 113 R

[56] References Cited
UNITED STATES PATENTS

| | | | |
|---|---|---|---|
| 2,906,660 | 9/1959 | Hungerford et al. | 162/156 X |
| 2,919,221 | 12/1959 | Labino | 161/169 |
| 3,312,775 | 4/1967 | Lambert | 156/53 UX |
| 3,614,299 | 7/1970 | Grail | 156/53 X |
| 3,687,850 | 8/1972 | Gagin | 162/156 X |

Primary Examiner—George F. Lesmes
Assistant Examiner—Lorraine T. Kendell
Attorney, Agent, or Firm—Cesari & McKenna

[57] ABSTRACT

An improved insulating tape formed of a layer, at least about 1 mil in thickness, of thermoplastic such as polypropylene and a relatively thick layer of glass paper of the type characterized by a thermal conductivity of about 0.3 BTU-inch per hr-ft$^2$-F°. When used to insulate copper conductors from a polyethylene jacket being extruded thereover, the insulating tape provides excellent protection for the conductors at polyethylene extrusion temperatures above 400°F. The tape is free of unidirectional reinforcing components and is characterized by sufficient elongation to allow flexing of the cable, good resistance to moisture migration along the interior of the cable, and excellent drape characteristics.

6 Claims, 3 Drawing Figures

THERMAL BARRIER TAPE

RELATED APPLICATION

This application is a continuation-in-part of U.S. Ser. No. 77,248 filed on Oct. 1, 1970 by Lania, et al., and entitled THERMAL BARRIER TAPE, and now abandoned.

BACKGROUND OF THE INVENTION

For a number of years, a common industrial cable-sheathing operation has included the steps of coating a bundle of copper conduits with a hot-melt sheathing formed of a thermoplastic, usually a thermoplastic such as polyethylene which is extruded over the conduit bundle in a hot viscous mass, usually at temperatures in the 350° F. – 450° F. range.

As long as the production line runs smoothly, this high-temperature extrusion of polyethylene over the cable will not present a serious problem, because the newly-extruded sheathing is immediately plunged into a water bath which serves to cool the plastic rapidly. However, an extruder operator must expect, and does experience, slow downs and stoppages in the operation of his extrusion lines. These interruptions often result in thermal damage to thin conductor strands of which the cable is comprised. These strands are often 0.024 inch or less in diameter. Because some such damage is to be expected in the sheathing of cable, the manufacturer of the cable usually makes an allowance for such damage when he rates the capacity of his cable. For example, although his cable may be constructed of 500 metal conductors he may rate it as if it were constructed of only 400 such conductors. Clearly this problem is of major economic significance and considerable savings are to be achieved by providing the cable manufacturer with a means whereby he can minimize the damage likely to be done by transient interruptions in the smooth flow of product on his extrusion line.

It has been known for some time to provide an insulating layer over the cable and beneath the hot thermoplastic sheathing. However, such insulating sheets have heretofore been deficient in some respect: for example, they either gave less insulating effect than is desirable, were excessively stiff like resin-impregnated papers, or they were excessively expensive. Indeed, it has been most difficult to provide an insulating sheet for this application which has suitably high performance characteristics and results in a cost savings to the user.

Among the criteria which must be met by insulating sheet useful in the above-described application are the following 1. It must have some significant elongation so that it will not rupture when the cable is wound on spools for storage or flexed during installation.
2. It should have abrasion resistance so that it can be stored and dispensed from spools without the use of a separator sheet.
3. It must have a high heat-distortion temperature.
4. It must not provide a path for transport of moisture in the cable if a break in the sheathing at some point allows moisture to enter the cable.
5. It must have stiffness characteristics that allow its use on "cigarette-wrap" type machines.
6. Its thermal insulation value must be high.
7. Finally, all the advantages should be achievable at little or no increase in cost and, of course, with a cost reduction if possible.

SUMMARY OF THE INVENTION

Therefore, it is an object of the invention to provide an improved method of insulating metallic conductors from thermoplastic coatings during the sheathing of the conductors with the thermoplastic.

Another object of the invention is to provide a relatively inexpensive insulating sheet which is characterized by excellent thermal insulation properties and excellent drape characteristics which allow it to be readily applied from a variety of conductor-wrapping machines.

Still another object of the invention is to provide an insulating sheet of the type described in the foregoing paragraph which has excellent abrasion resistance, does not facilitate the passage of moisture therealong, and is less expensive to manufacture than previously-known insulating materials most nearly meeting its performance characteristics.

Another object of the invention is to provide a novel cable assembly comprising the improved insulating sheet of the invention.

Other objects of the invention will be obvious to those skilled in the art on reading the instant application.

The above objects have been substantially accomplished as a consequence of the development of a laminate formed of (1) a "paper glass" material characterized by a thermal conductivity of less than about 0.4 BTU-in per hr-ft$^2$-F° and a density of 0.07 to 0.015 lbs per square yard per mil of thickness and (2) a thermoplastic. The most advantageous of such paper glass materials are those such as sold under the trade designations "25-84 Beta Glass" and "25-91 D-E Glass" by the Crane Paper Company. The former of these is sometimes referred to herein as "beta glass" and the latter as "delta glass." They are characterized by a very low, i.e., less than 10%, organic binder content and a thermal conductivity of about 0.3 BTU-inch per hr-ft$^2$-F° or less. These favored glass papers have the additional highly favorable characteristic of being relatively non-irritating to workmen involved in manufacturing operations in which they are used.

The thermoplastic is advantageously characterized by a high dielectric strength, e.g., a material having a breakdown voltage of 7,000–10,000 volts according to the standard test developed by Western Electric Company and known in the art. The most advantageous thermoplastic materials are polypropylene and poly(ethyleneterephthalate), the latter being best known by the tradename of E. I. Dupont de Nemours and Company, Inc., i.e., Mylar.

Although it is possible to form a suitable bond between the glass paper and thermoplastic, it is often desirable to use a small amount of an oil-resistant polymeric adhesive such as those formed of acrylic or modacrylic polymers, of nitrile rubber, or of poly(vinyl acetate). By oil resistant is meant resistant to napthas and lubricating oils of the type normally encountered in the above-described conductor-insulating application.

A particular advantage of the insulation tape of the invention is that the polymer-bearing thickness of the laminate need be only about 3 mils or less in thickness. This allows an excellent drape characteristic when the 1 to 3 mil-thick polymer ply is combined with a 3- to 20-mil glass paper ply. In the most advantageous embodiments of the invention the thickness ratio of glass ply to polymer ply is from about 2:1 to about 5:1.

It has been found particularly desirable to use the thermoplastic polymer component of the tape in two portions, one on either side of the glass paper component. The resulting tape loses none of its important mechanical and thermal problems, but becomes very much easier to package and process. Moreover, it further reduces the chance of irritation to workers from any glass fibers.

ILLUSTRATIVE EMBODIMENT OF THE INVENTION

In this application and accompanying drawings, there is shown and described a preferred embodiment of the invention and there are suggested various alternatives and modifications thereof, but it is to be understood that these are not intended to be exhaustive and that other changes and modifications can be made within the scope of the invention. These suggestions herein are selected and included for purposes of illustration in order that others skilled in the art will more fully understand the invention and the principles thereof and will be able to modify it and embody it in a variety of forms, each as may be best suited in the condition of a particular case.

IN THE DRAWINGS

Figure 1:
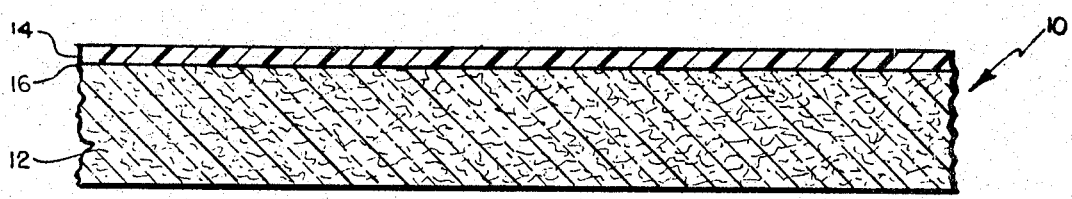
FIG. 1 is a schematic sectional view of an insulating tape constructed according to the invention.

Referring to FIG. 1, it is seen that an insulating tape 10 comprises a glass paper ply 12 and a thermopolymeric ply 14 of polypropylene. The bond between the polypropylene and glass paper is formed of a commercially-available nitrile rubber-based adhesive 16 of the conventional type.

Figure 2:
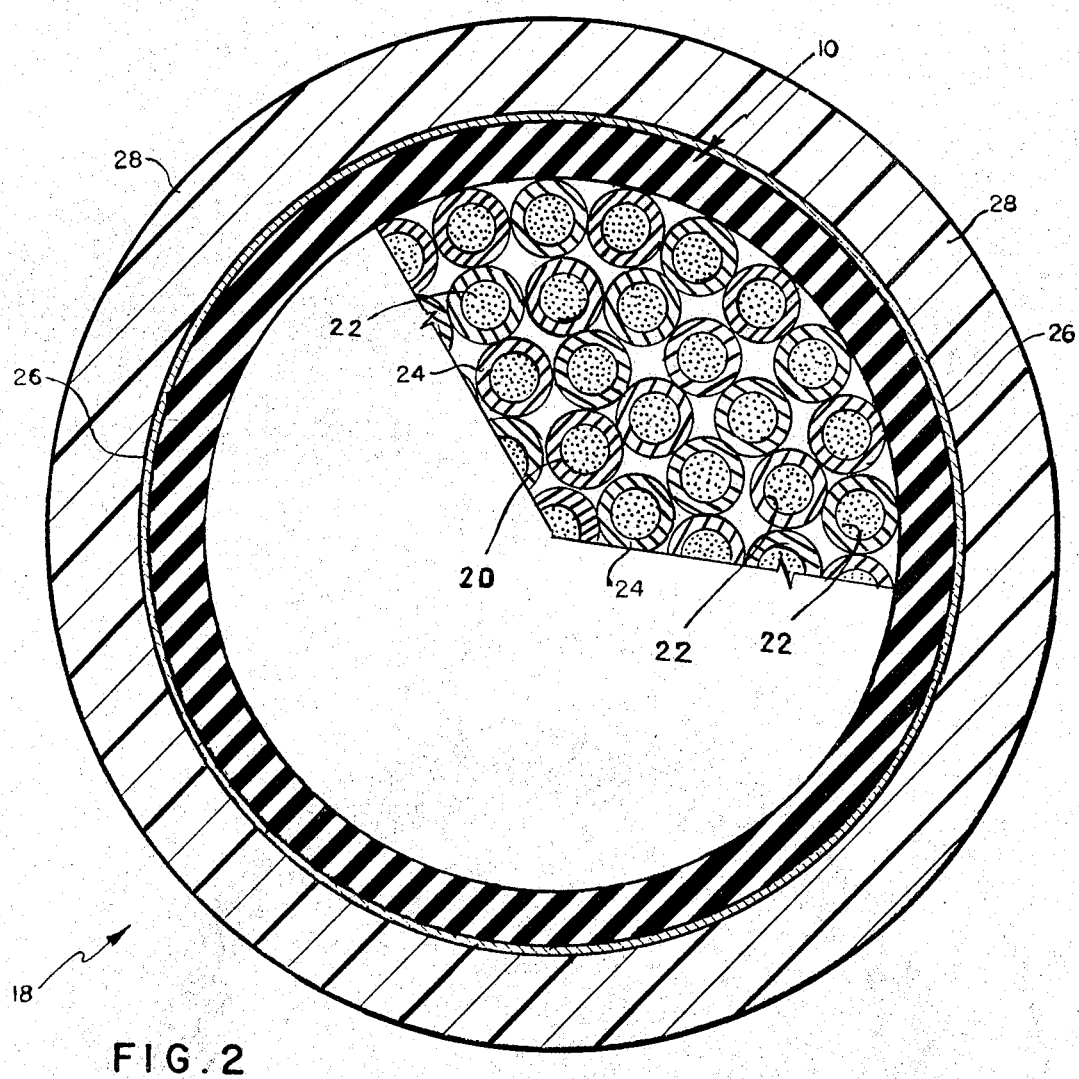
FIG. 2 is a schematic section of the novel cable comprising the insulating sheet of the invention.

FIG. 2 illustrates a cross section of a cable 18 formed using the tape 10 of FIG. 1 as an insulating layer therein: This cable 18 comprises a number of wires 20 each formed of a plurality of copper wire strands 22 of about 0.012 mil in diameter and a polyethylene jacket 24 about 6 mils thick. Wires 20 are enclosed with the insulating sheet 10 of FIG. 1. An aluminum sheet 26 is placed over insulating sheet 10 and an outer polyethylene sheet 28 is extruded over the aluminum sheet 26.

An empirical test has been developed and found useful in establishing the performance of insulating tapes in cable-insulating applications:

The test is carried out by taking two equilateral triangles which are 2 inches on a side and formed from 22 gauge telephone wire having a 6-mil polyethylene jacket thereover, superimposing and intertwining one triangle on the other, then rotating one triangle 60°. This results in a test circuit of two loops with six points at which the polyethylene-insulated wires contact each other. The circuit is then placed over an insulating surface of asbestos, connected into an electrical circuit through an ohmmeter so that any short circuit across the two triangles can be readily detected, and covered by a single layer of an insulating tape to be tested. A 1 pound hot plate with its surface at the test temperature is then inverted and placed on the insulating tape. The time required to short circuit the wire loops is measured. The test temperature is in good correlation with the actual temperature of a thin metal shield which is usually placed intermediate the conductors and the thermoplastic shield as it is extruded thereover. This is a test to the point of failure of the insulation about the strands and is indicative of the degree of protection provided by the various tapes during cable manufacture.

Figure 3:
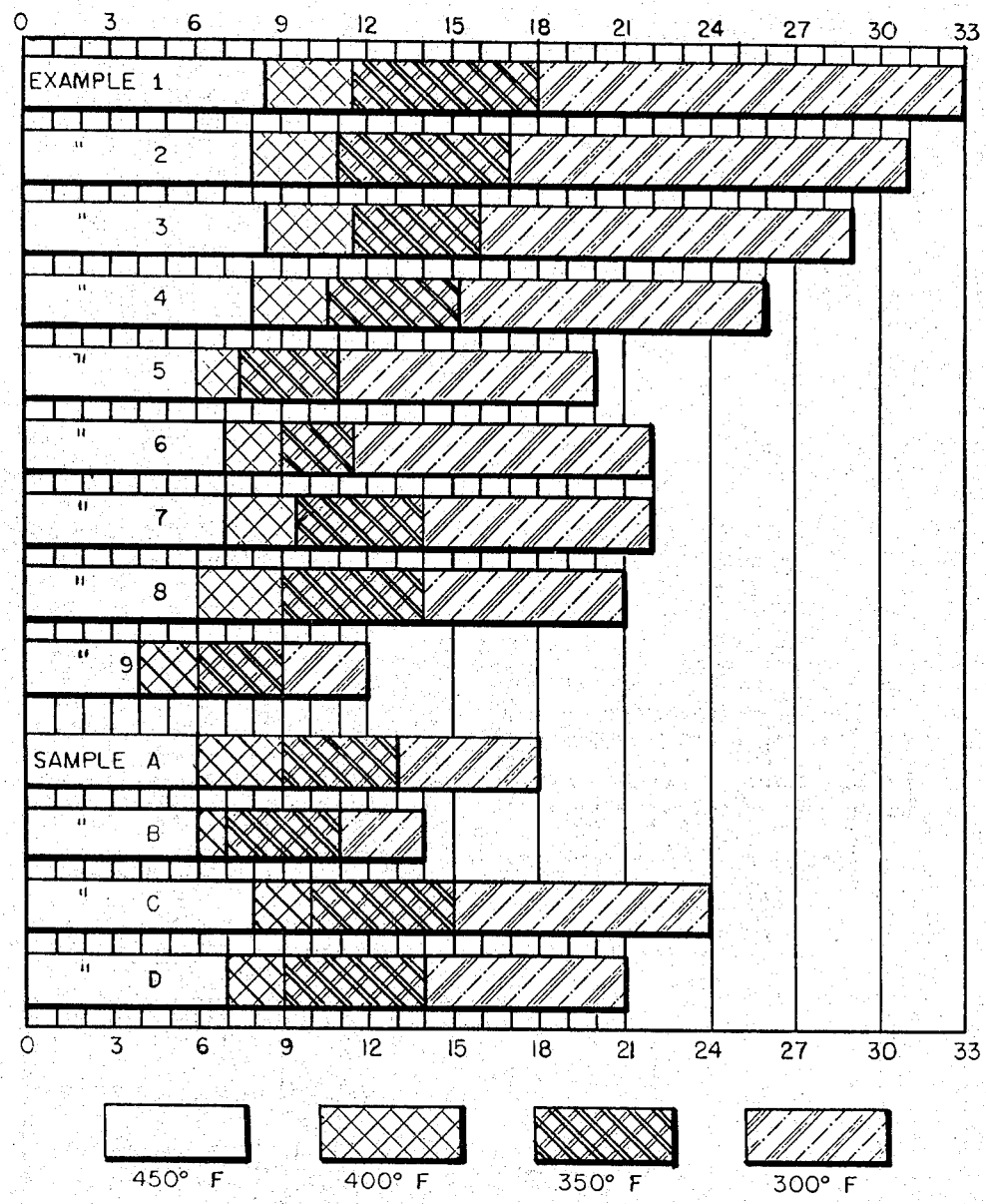
FIG. 3 is a graph illustrating the relative heat-resistance of various embodiments of the insulator of the invention and competitive products.

Referring to FIG. 3, it is seen that insulating tapes of the invention having only 1.5 to 3 mils of polymer withstand temperatures of 300° F. for 33 seconds before failure and temperatures of 450° F. for over 8 seconds without failure when subjected to the above-described test.

This test was used to evaluate a number of products made according to the invention and a number of other products including those having well-established commercial acceptance. The following table discloses the compositions of each laminate evaluated in Table 3.

Example 1: 2 mils polyester, 10 mils 25–91 glass paper

Example 2: 1.5 mils polyester, 10 mils 25–91 glass paper

Example 3: 5 mils polypropylene, 10 mils 25–91 glass paper

Example 4: 3 mils polypropylene, 10 mils of 25–91 glass paper

Example 5: 3 mils polypropylene, 7 mils of 25–84 glass paper

Example 6: 5 mils polypropylene, 7 mils of 25–84 glass paper

Example 7: 2 mils polyester, 7 mils of 25–84 glass paper

Example 8: 1.5 mils polyester, 7 mils of 25–84 glass paper

Example 9: 1.5 mils polyester, 3 mils of 25–84 glass paper

Sample A: A product sold under the trade designation C-7166 by Chase and Sons, Inc. and consisting of a 3 mil ply of polypropylene and a 13-mil ply of a thermoset styrene-butadiene copolymer.

Sample B: A product sold under the trade designation C-138 by Chase and Sons, Inc., and consisting of a 1-mil ply of a poly(ethyleneterephthalate) and a 15-mil ply of a thermoset styrene-butadiene copolymer.

Sample C: A product sold under the trade designation C-7031 by Chase and Sons, Inc., and consisting of a 5-mil ply of polypropylene and a 10-mil ply of a thermoset styrene-butadiene copolymer.

Sample D: L-670—An experimental product comprising a 5-mil ply of polypropylene and a 10-mil ply of a spun-bonded polyester resin material sold under the trade designation Reemay by E. I. Dupont de Nemours and Co., Inc.

The polyester used in Examples 1–2 and 7–9 is a poly(ethyleneterephthalate) sheet and tape which are sold under the trade designation Mylar by the aforesaid Dupont Company.

It will be evident from studying the test results shown in FIG. 3 that significant performance improvement is exhibited by insulating sheets prepared according to the invention, i.e., sheets described as Examples 1 through 9. These sheets not only show improved thermal resistance to the transient stops and slow downs in the extrusion line, but they also have improved drape characteristics over such materials as those styrene-butadiene copolymer based tapes which most closely approximate their protective characteristics.

The Reemay-reinforced tape has the problem of compressing undesirably when under heat and pressure and this detracts from its insulating capability. Moreover, it has been found that the high-surface-area of spun-bonded polyester is excessively compatible with moisture to provide an insulating material which is suitable for long-term use.

One particularly important advantage of the invention is the discovery that the product can be manufactured at but a fraction of the labor and machine costs of the products that it supplants. For example, one manufacturer has discovered that he can manufacture twice as much material with half as many men when using the invention rather than making his earlier all polymeric insulation sheet.

It is also to be understood that the following claims are intended to cover all of the generic and specific features of the invention herein described and all statements of the scope of the invention which might be said to fall therebetween.

What is claimed is:

1. A flexible heat insulating tape suitable for use in making an electrical cable by placement between the primary conducting members thereof and a hot-melt thermoplastic sheathing, and consisting of (a) a polymer component, formed of a thermoplastic resin having a breakdown voltage of at least 7,000 and a heat-distortion temperature of at least 200° F. and which component is from 1 to 3 mils in thickness and (b) a glass paper ply on one side of, or sandwiched between two sheets forming said polymer component, and characterized by a thermal conductivity of about 0.3 BTU-inch per hr-ft$^2$-F°, and not over about 10% organic binder, said paper ply being from 3 to 20 mils in thickness and forming the major portion of the thickness of said tape.

2. A heat-insulating tape as defined in claim 1 comprising a naptha-resistant polymeric adhesive bounding said polymer and paper.

3. A heat-insulating tape as defined in claim 1 which is characterized by a heat-distortion temperature of at least 200° F.

4. A flexible heat insulating tape as defined in claim 1 consisting of (a) a thermoplastic polymer component formed of polyester or of polypropylene and of 1 to 3 mils in thickness and (b) a glass paper ply characterized by a thermal conductivity of about 0.3 BTU-inch per hr-ft$^2$-F° and not over about 10% organic binder, said paper ply being from 3 to 20 mils in thickness and forming the major portion of the thickness of said tape.

5. A heat-insulating tape as defined in claim 4 comprising a naptha-resistant polymeric adhesive bounding said polymer and paper.

6. A heat-insulating tape as defined in claim 4 which is characterized by a heat-distortion temperature of at least 200° F.

* * * * *